(12) United States Patent
Xie et al.

(10) Patent No.: US 12,437,306 B2
(45) Date of Patent: Oct. 7, 2025

(54) BLOCKCHAIN-BASED GREEN POWER CERTIFICATION METHOD, APPARATUS, AND SYSTEM

(71) Applicants: STATE GRID BLOCKCHAIN TECHNOLOGY (BEIJING) CO., LTD., Beijing (CN); BEIJING POWER EXCHANGE CENTER CO., LTD., Beijing (CN); STATE GRID DIGITAL TECHNOLOGY HOLDING CO., LTD., Beijing (CN); STATE GRID CORPORATION OF CHINA, Beijing (CN); JIANGXI POWER EXCHANGE CENTER CO., LTD., Jiangxi (CN); LIAONING POWER EXCHANGE CENTER CO., LTD., Liaoning (CN); EAST INNER MONGOLIA POWER EXCHANGE CENTER COMPANY LTD., Inner Mongolia (CN)

(72) Inventors: Kai Xie, Beijing (CN); Dong Wang, Beijing (CN); Xian Zhang, Beijing (CN); Hejian Wang, Beijing (CN); Da Li, Beijing (CN); Wen Xie, Beijing (CN); Shijie Ji, Beijing (CN); Yonghui Liu, Beijing (CN); Nan Zhang, Beijing (CN); Jiaxing Xuan, Beijing (CN); Tian Sun, Beijing (CN); Desheng Bai, Beijing (CN); Shengnan Zhang, Beijing (CN); Xin Li, Inner Mongolia (CN); Gang Chen, Jiangxi (CN); Haiqing Jia, Inner Mongolia (CN); Zhe Zhang, Beijing (CN); Hexiao Liang, Beijing (CN); Qingchun Li, Liaoning (CN); Kun Fan, Jiangxi (CN); Shengzhi Lu, Beijing (CN); Chao Yang, Liaoning (CN); Liang Zhao, Beijing (CN); Jingli Feng, Beijing (CN); Fan Jia, Beijing (CN); Tong Xing, Beijing (CN); Lihua Zhao, Beijing (CN); Guomin Li, Beijing (CN); Zhan Su, Beijing (CN)

(73) Assignees: STATE GRID BLOCKCHAIN TECHNOLOGY (BEIJING) CO., LTD., Beijing (CN); BEIJING POWER EXCHANGE CENTER CO., LTD., Beijing (CN); STATE GRID DIGITAL TECHNOLOGY HOLDING CO., LTD., Beijing (CN); STATE GRID CORPORATION OF CHINA, Beijing (CN); JIANGXI POWER EXCHANGE CENTER CO., LTD., Nanchang (CN); LIAONING POWER EXCHANGE CENTER CO., LTD., Shenyang (CN); EAST INNER MONGOLIA POWER EXCHANGE CENTER COMPANY LTD., Hohhot (CN)

( * ) Notice: Subject to any disclaimer, the term of this patent is extended or adjusted under 35 U.S.C. 154(b) by 0 days.

(21) Appl. No.: 18/019,482
(22) PCT Filed: Aug. 19, 2022
(86) PCT No.: PCT/CN2022/113775
§ 371 (c)(1),
(2) Date: Feb. 3, 2023
(87) PCT Pub. No.: WO2023/045654
PCT Pub. Date: Mar. 30, 2023

(65) Prior Publication Data
US 2024/0257148 A1  Aug. 1, 2024

(30) Foreign Application Priority Data
Sep. 22, 2021 (CN) .......................... 202111104003.6

(51) Int. Cl.
*G06Q 30/018* (2023.01)
*H04L 9/32* (2006.01)
(52) U.S. Cl.
CPC ......... *G06Q 30/018* (2013.01); *H04L 9/3213* (2013.01); *H04L 9/3265* (2013.01); *G06Q 2220/00* (2013.01)
(58) Field of Classification Search
None
See application file for complete search history.

(56) References Cited

U.S. PATENT DOCUMENTS

2010/0138058 A1* 6/2010 Kirchner ................... F03D 9/10
700/286

FOREIGN PATENT DOCUMENTS

CN           114078061 A       2/2022

OTHER PUBLICATIONS

Sharma, Blockchain Technology Toward Green IoT: Opportunities and Challenges, IEEE Network, Jul./Aug. 2020 (Year: 2020).*

(Continued)

*Primary Examiner* — Kiersten V Summers

(57) ABSTRACT

The present disclosure provides a blockchain-based green power certification method, apparatus, and system, to pre- (Continued)

process obtained basic data to obtain proof-of-existence data, certify the proof-of-existence data from a production side and a consumption side by using a certification chain and a token chain respectively, and obtain a green power attribute certificate and a green power consumption label if the certification is passed; generate a unique digital identifier for the green power attribute certificate and the green power consumption label separately based on a non-fungible token (NFT), which realizes non-interchangeability, indivisibility, and other characteristics of the certificate and the identifier; and supervise and verify a certification process by using a chain of custody, and generate a corresponding unique blockchain identifier for the certification chain, the token chain, and the chain of custody separately through multi-chain interaction, so as to realize data interaction between blockchains.

9 Claims, 3 Drawing Sheets

(56) References Cited

U.S. PATENT DOCUMENTS

| | | | | |
|---|---|---|---|---|
| 2013/0204452 | A1* | 8/2013 | Yamaguchi | H04B 3/54 |
| | | | | 700/292 |
| 2015/0184550 | A1* | 7/2015 | Wichmann | G05B 13/04 |
| | | | | 700/287 |
| 2016/0181807 | A1* | 6/2016 | Day | H02J 3/003 |
| | | | | 307/31 |
| 2017/0013789 | A1* | 1/2017 | Bose | A01G 9/243 |
| 2017/0103468 | A1* | 4/2017 | Orsini | H04L 63/12 |
| 2017/0205452 | A1* | 7/2017 | Murai | H02J 3/00 |
| 2018/0152023 | A1* | 5/2018 | Guruprasad | H02J 3/38 |
| 2019/0253263 | A1* | 8/2019 | Qiu | H04L 63/102 |
| 2019/0311443 | A1* | 10/2019 | Blades | H04L 9/3239 |
| 2020/0076891 | A1* | 3/2020 | Stuart | H04L 63/12 |
| 2021/0287309 | A1* | 9/2021 | Gebhardt | G05B 13/027 |
| 2021/0382814 | A1 | 12/2021 | Moondhra et al. | |
| 2022/0156754 | A1* | 5/2022 | MacArthur | G06Q 30/018 |
| 2022/0180374 | A1* | 6/2022 | Cooner | G06Q 20/145 |

OTHER PUBLICATIONS

Zhang, Application of Blockchain in Renewable Energy Certificates, Association for Computing Machinery, Oct. 20-22, 2020 (Year: 2020).*

* cited by examiner

BLOCKCHAIN-BASED GREEN POWER CERTIFICATION METHOD, APPARATUS, AND SYSTEM

TECHNICAL FIELD

The present disclosure relates to a technical field of information processing, and in particular, to a blockchain-based green power certification method, apparatus, and system.

BACKGROUND

Renewable energy is a main force to promote green transformation of energy and economy. Therefore, how to further increase a proportion of the renewable energy and ensure accommodation of new energy at a guaranteed amount and price is of great significance to promote construction of a clean, low-carbon, safe and efficient energy system, accelerate construction of a new power system dominated by the new energy, better serve peak carbon dioxide emissions and carbon neutrality.

However, traditional green power attribute certification and green power consumption evaluation lack related standards, and a unified standard certification and consumption evaluation process and method have not been formed, which seriously restricts the development of green renewable energy. Even if a blockchain-based green power certification system is proposed, an existing technical solution performs only data collection for a sampled electricity meter and performs a proof-of-existence operation for collected data on a chain, and cannot accurately determine a green power attribute. A certification mechanism is not accurate. As a result, problems of information asymmetry and data opaqueness in attribute certification and consumption evaluation processes of the renewable energy cannot be resolved, failing to meet a demand for effective technical support to promote the development of the renewable energy.

SUMMARY

To resolve the above problems, the present disclosure provides a blockchain-based green power certification method, apparatus, and system, so as to resolve problems of an inaccurate certification mechanism of renewable energy, and information asymmetry and data opaqueness in an attribute certification and consumption evaluation process of the renewable energy.

To achieve the above objective, the present disclosure provides following technical solutions.

A blockchain-based green power certification method includes:

pre-processing obtained basic data to obtain structured data and unstructured data, where the structured data includes associated data that maps an entity identifier of a device related to renewable energy into business data of a power business system, and the unstructured data includes announcement-associated data and electronic contract-associated data in a power business;

performing a proof-of-existence operation for the structured data and the unstructured data on a certification chain to obtain proof-of-existence data, and controlling the certification chain to periodically send the proof-of-existence data to a token chain through multi-chain interaction, where the certification chain is a blockchain used to achieve green power attribute certification and certificate issuance, and the token chain is a blockchain used to achieve green power consumption evaluation and consumption label issuance, the multi-chain interaction is to register an identifier for each blockchain, such that each blockchain has a unique blockchain identifier, and data interaction is performed between blockchains based on their own blockchain identifiers;

controlling the certification chain to call a green power certification model and the proof-of-existence data to obtain constraints of the green power certification model, determining, based on the constraints and the proof-of-existence data, whether an attribute of electric energy generated by a power station is a green power attribute, and if the attribute of the electric energy generated by the power station is the green power attribute, generating a green power attribute certificate by using the certification chain, where the constraints include a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;

controlling the token chain to call a consumption evaluation model and the proof-of-existence data to determine whether the power user on a power consumption side performs green power consumption, and if the power user on the power consumption side performs the green power consumption, generating a green power consumption label by using the token chain, where the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;

generating a unique digital identifier for the green power attribute certificate and the green power consumption label separately based on a non-fungible token (NFT); and in a green power attribute certification process of the certification chain and in a green power consumption certification process of the token chain, supervising and verifying, by using a chain of custody, execution information of each node in the certification processes of the certification chain and the token chain; and storing the unique digital identifier in the token chain if the execution information passes the supervision and verification, or storing abnormal associated data in the chain of custody if the execution information does not pass the supervision and verification, where the chain of custody performs data interaction with the certification chain and the token chain through the multi-chain interaction in a supervision and verification process, and the execution information includes operation status information of each node, execution status information of a consensus algorithm, and execution status information of a smart contract.

Optionally, the method further includes:
storing supervision data obtained in the supervision and verification process in the chain of custody, where the storing abnormal associated data in the chain of custody if the execution information does not pass the supervision and verification includes:
if the execution information does not pass the supervision and verification, controlling the chain of custody to obtain data in the certification process through the multi-chain interaction, processing abnormal data to obtain the abnormal associated data, and storing the abnormal associated data in the chain of custody, where the abnormal associated data includes abnormality pre-warning and prediction data.

Optionally, the pre-processing obtained basic data to obtain structured data and unstructured data includes:
obtaining the basic data, including device information of a whole production chain of renewable power, the business data of the power business system, and the announcement-associated data and the electronic contract-associated data in the power business;
generating a device code of each device in the whole production chain of the renewable power based on the device information of the whole production chain of the renewable power;
mapping the device code into the business data of the power business system to obtain associated data, and determining the associated data as the structured data; and
standardizing the announcement-associated data and the electronic contract-associated data in the power business, and determining processed data as the unstructured data.

Optionally, the determining, based on the constraints and the proof-of-existence data, whether an attribute of electric energy generated by a power station is a green power attribute includes:
in response to that the proof-of-existence data meets all of the first constraint, the second constraint, and the third constraint, and is consistent with a cross-validation result of the entity identifier of the device related to the renewable energy, the business data of the power business system, and the electronic contract-associated data, determining that the attribute of the electric energy generated by the power station is the green power attribute.

Optionally, the controlling the token chain to call a consumption evaluation model and the proof-of-existence data to determine whether the power user on a power consumption side performs green power consumption includes:
controlling the token chain to call the consumption evaluation model to obtain the user environment evaluation parameter on the power consumption side;
calculating a value of a user environment evaluation index on the power consumption side based on the user environment evaluation parameter on the power consumption side, as well as a weight, an evaluation score, and a correlation coefficient that correspond to each user environment evaluation parameter on the power consumption side;
controlling the token chain to call the consumption evaluation model to obtain electric energy data of the user on the power consumption side, where the electric energy data includes a sum of renewable energy power generated by a self-built power generation facility, a sum of renewable energy power purchased according to electricity purchasing and selling contracts, a sum of renewable energy power labeled on a purchased green power attribute certificate, a sum of renewable energy power used by an upstream supplier, a sum of renewable energy power used by the power user in a target cycle, and a sum of all power used in the target cycle;
calculating a value of a green power consumption evaluation index based on the electric energy data; and
determining, based on the value of the user environment evaluation index and the value of the green power consumption evaluation index on the power consumption side, whether the power user on the power consumption side performs the green power consumption.

Optionally, the unique blockchain identifier includes prefix information and distinction information, the prefix information is prefix code information that is the same as that of other blockchains, the distinction information is code information different from that of the other blockchains, and data interworking is realized between the blockchains based on a unique blockchain identifier of each blockchain.

Optionally, the generating a green power attribute certificate by using the certification chain includes:
calling the proof-of-existence data by using the certification chain, to determine content of the green power attribute certificate, where the content of the green power attribute certificate includes a certificate number, a proof-of-existence number, proof-of-existence time, a power generation enterprise, a power generation type, production data, power generation data, and a settlement status, and the proof-of-existence number and the proof-of-existence time respectively represent a number and time of an proof-of-existence operation that is performed on the token chain for an identifier issued by the NFT and verified by the chain of custody; and
generating the green power attribute certificate based on the content of the green power attribute certificate.

Optionally, the green power consumption label includes a label number, a proof-of-existence number, proof-of-existence time, a power consumption enterprise, a percentage of a consumed electricity quantity, an enterprise environment evaluation rating, and consumption cycle data, and the label number and the proof-of-existence time respectively represent a number and time of an proof-of-existence operation that is performed on the token chain for an identifier issued by the NFT and verified by the chain of custody.

A blockchain-based green power certification apparatus includes:
a data pre-processing unit configured to pre-process obtained basic data to obtain structured data and unstructured data, where the structured data includes associated data that maps an entity identifier of a device related to renewable energy into business data of a power business system, and the unstructured data includes announcement-associated data and electronic contract-associated data in a power business;
a proof-of-existence unit configured to perform a proof-of-existence operation for the structured data and the unstructured data on a certification chain to obtain proof-of-existence data, and control the certification chain to periodically send the proof-of-existence data to a token chain through multi-chain interaction, where the certification chain is a blockchain used to achieve green power attribute certification and certificate issuance, and the token chain is a blockchain used to achieve green power consumption evaluation and consumption label issuance, the multi-chain interaction is to register an identifier for each blockchain, such that each blockchain has a unique blockchain identifier, and data interaction is performed between blockchains based on their own blockchain identifiers;

a first certification unit configured to: control the certification chain to call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate by using the certification chain, where the constraints include a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;

a second certification unit configured to: control the token chain to call a consumption evaluation model and the proof-of-existence data to determine whether the power user on a power consumption side performs green power consumption, and if the power user on the power consumption side performs the green power consumption, generate a green power consumption label by using the token chain, where the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;

a generation unit configured to generate a unique digital identifier for the green power attribute certificate and the green power consumption label separately based on an NFT; and a storage unit configured to: in a green power attribute certification process of the certification chain and in a green power consumption certification process of the token chain, supervise and verify, by using a chain of custody, execution information of each node in the certification processes of the certification chain and the token chain; and store the unique digital identifier in the token chain if the execution information passes the supervision and verification, or store abnormal associated data in the chain of custody if the execution information does not pass the supervision and verification, where the chain of custody performs data interaction with the certification chain and the token chain through the multi-chain interaction in a supervision and verification process, and the execution information includes operation status information of each node, execution status information of a consensus algorithm, and execution status information of a smart contract.

A blockchain-based green power certification system includes:

a data obtaining module, a certification chain, a token chain, a chain of custody, an interaction module, and a token service module, where the data obtaining module is configured to pre-process obtained basic data to obtain structured data and unstructured data, and send the structured data and the unstructured data to the certification chain, where the structured data includes associated data that maps an entity identifier of a device related to renewable energy into business data of a power business system, and the unstructured data includes announcement-associated data and electronic contract-associated data in a power business;

the certification chain is configured to perform a proof-of-existence operation for the structured data and the unstructured data to obtain proof-of-existence data, and periodically send the proof-of-existence data to the token chain based on the interaction module;

the certification chain is further configured to: call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate, where the constraints include a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;

the token chain is configured to: call a consumption evaluation model and the proof-of-existence data to determine whether the power user on a power consumption side performs green power consumption, and if the power user on the power consumption side performs the green power consumption, generate a green power consumption label, where the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;

the token service module is configured to generate a unique digital identifier for the green power attribute certificate and the green power consumption label separately based on an NFT;

the chain of custody is configured to: in a green power attribute certification process of the certification chain and in a green power consumption certification process of the token chain, supervise and verify execution information of each node in the certification processes of the certification chain and the token chain; and store the unique digital identifier in the token chain if the execution information passes the supervision and verification, or store abnormal associated data in the chain of custody if the execution information does not pass the supervision and verification, where the chain of custody performs data interaction with the certification chain and the token chain by using the interaction module in a supervision and verification process, and the execution information includes operation status information of each node, execution status information of a consensus algorithm, and execution status information of a smart contract; and the interaction module is configured to generate a corresponding unique blockchain identifier for the certification chain, the token chain, and the chain of custody separately, such that the certification chain, the token chain, and the chain of custody can realize data interaction by using the interaction module.

Compared with the prior art, the present disclosure provides a blockchain-based green power certification method, apparatus, and system, to pre-process obtained basic data to obtain proof-of-existence data, certify the proof-of-existence data from a production side and a consumption side by using a certification chain and a token chain respectively, and obtain a green power attribute certificate and a green power consumption label if the certification is passed; generate a unique digital identifier for the green power attribute certificate and the green power consumption label separately based on an NFT, which realizes non-interchangeability, indivisibility, and other characteristics of the certificate and the identifier; and supervise and verify a certification process by using a chain of custody, and generate a corresponding unique blockchain identifier for the certification chain, the token chain, and the chain of custody separately through multi-chain interaction, so as to realize data interaction between blockchains. This resolves problems of an inaccurate certification mechanism of renewable energy, and information asymmetry and data opaqueness in attribute certification and consumption evaluation processes of the renewable energy.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description merely show the embodiments of the present disclosure, and a person of ordinary skill in the art may still derive other drawings from the provided accompanying drawings without creative efforts.

DETAILED DESCRIPTION

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by the person of ordinary skill in the art based on the embodiments of the present disclosure without creative efforts shall fall within the protection scope of the present disclosure.

The terms "first", "second", and the like in the specification, claims and the accompanying drawings of the present disclosure are intended to distinguish between different objects but do not describe a specific sequence. Moreover, the terms "include", "have", and any variations thereof mean to cover non-exclusive inclusion. For example, a process, method, system, product or device that includes a series of steps or units is not limited to the listed steps or units, and also includes steps or units that are not listed Embodiment 1

Figure 1:
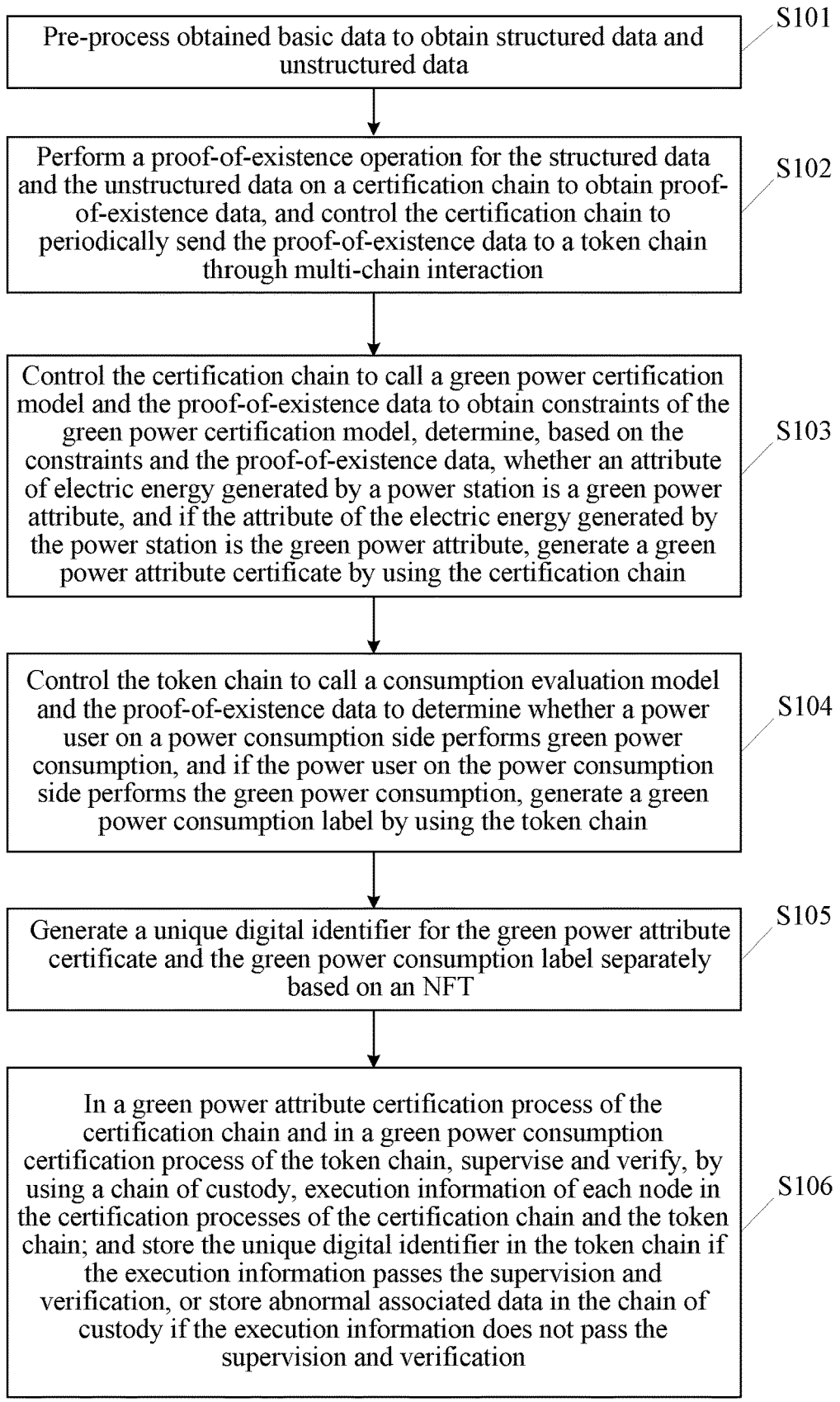
FIG. 1 is a schematic flowchart of a blockchain-based green power certification method according to Embodiment 1 of the present disclosure.

This embodiment provides a blockchain-based green power certification method. As shown in FIG. 1, this method may include the following steps.

S101: Pre-process obtained basic data to obtain structured data and unstructured data.

The structured data includes associated data that maps an entity identifier of a device related to renewable energy into business data of a power business system, and the unstructured data includes announcement-associated data and electronic contract-associated data in a power business.

S102: Perform a proof-of-existence operation for the structured data and the unstructured data on a certification chain to obtain proof-of-existence data, and control the certification chain to periodically send the proof-of-existence data to a token chain through multi-chain interaction.

The certification chain is a blockchain used to achieve green power attribute certification and certificate issuance, and the token chain is a blockchain used to achieve green power consumption evaluation and consumption label issuance, the multi-chain interaction is to register an identifier for each blockchain, such that each blockchain has a unique blockchain identifier, and data interaction is performed between blockchains based on their own blockchain identifiers.

In an implementation of this embodiment of the present disclosure, the pre-processing obtained basic data to obtain structured data and unstructured data includes:

obtaining the basic data;

generating a device code of each device in a whole production chain of renewable power based on device information of the whole production chain of the renewable power;

mapping the device code into the business data of the power business system to obtain associated data, and determining the associated data as the structured data; and standardizing the announcement-associated data and the electronic contract-associated data in the power business, and determining processed data as the unstructured data.

The basic data includes the device information of the whole production chain of the renewable power, the business data of the power business system, and the announcement-associated data and the electronic contract-associated data in the power business. Specifically, the renewable energy includes solar energy, wind energy, hydro energy, biomass energy, geothermal energy, and the like. Then, based on the device information of the whole production chain of the renewable power, the device code of each device in the whole production chain of the renewable power is generated, in other words, entity identifiers of a device and an apparatus that are related to the whole production chain are generated. The electronic contract-associated data is relevant contract data used in the green power attribute certification and green power consumption certification, for example, may be an electronic electricity purchasing or selling contract.

The business data of the power business system includes power generation curves, on-grid electricity quantities, settled electricity quantities, ledgers, locations, and other data information of a power regulation system, a transaction system, a marketing system, a geographic information system (GIS), and other power business systems. After the device code is mapped into the corresponding business data, the associated data is obtained. The associated data is the structured data. That is, the proof-of-existence operation is performed for the structured data, namely, "entity identifier+ business system data information", on the certification chain. The unstructured data includes the announcement-associated data and the electronic contract-associated data in the power business. Specifically, the proof-of-existence operation may be performed for the unstructured data such as the electronic electricity purchasing or selling contract, a transaction announcement, a green power production commitment letter on the certification chain.

Both the certification chain and the token chain are blockchains. The certification chain is the blockchain used to achieve the green power attribute certification and the certificate issuance, and the token chain is the blockchain used to achieve the green power consumption evaluation and the consumption label issuance. In this embodiment of the present disclosure, the certification chain and the token chain can realize data interaction through the multi-chain interaction. The multi-chain interaction is to register the identifier for each blockchain, such that each blockchain has the unique blockchain identifier, and the data interaction is performed between the blockchains based on their own blockchain identifiers.

Specifically, the unique blockchain identifier includes prefix information and distinction information, the prefix information is prefix code information that is the same as that of other blockchains, the distinction information is code information different from that of the other blockchains, and data interworking is realized between the blockchains based on a unique blockchain identifier of each blockchain.

In this embodiment of the present disclosure, a multi-chain collaborative, fair, and reliable interaction mode is constructed through the multi-chain interaction, realizing trusted linking and efficient collaboration of cross-chain resources, breaking a data barrier, realizing interconnection, resource sharing, reliable supervision, and the like.

S103: Control the certification chain to call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate by using the certification chain.

The constraints include a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time.

The green power certification model is a certification model generated based on the planned power generation curve of the power station, the predicted power consumption curve of the power user, the on-grid electricity quantity, the settled electricity quantity, and measurement data of the smart electricity meter. In this embodiment of the present disclosure, a smart contract is constructed by using the green power certification model, such that the certification chain automatically executes the smart contract to complete the green power attribute certification. This provides basic public service support for formulation and implementation of a smart contact for the green power attribute certification and a smart contract for the certificate issuance, and realizes the green power attribute certification and the certificate issuance based on the certification chain, performs the green power attribute certification and the certificate issuance on the chain, and improves credibility of the green power attribute certification and the certificate issuance.

Moreover, in this embodiment of the present disclosure, the green power certification model performs certification not simply based on data of the electricity meter, but based on planned power generation data of the power station, predicted power consumption data of the user, actual on-grid and settled electricity quantities, and the measurement data of the electricity meter. This process will be described in detail in a subsequent embodiment of the present disclosure.

S104: Control the token chain to call a consumption evaluation model and the proof-of-existence data to determine whether the power user on a power consumption side performs green power consumption, and if the power user on the power consumption side performs the green power consumption, generate a green power consumption label by using the token chain.

The consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise.

A smart contract for green power consumption is constructed based on the consumption evaluation model, such that the token chain completes the green power consumption certification by automatically executing the smart contract. After the certification is passed, a consumption label issuance unit of the token chain issues a "green power consumption label" on the chain. The consumption evaluation model mainly includes the user environment evaluation parameter and the green power consumption evaluation parameter on the power consumption side. The user environment evaluation parameter is the green rating of the power consumption enterprise or individual. A green enterprise is an enterprise whose main business contributes to environmental improvement. The green rating may be 5A, 4A, 3A, or the like. The green power consumption evaluation parameter is the proportion of the green power consumption of the enterprise, and its value may be 100%, 95%, 80%, or the like.

The green power consumption evaluation and the consumption label issuance are realized based on the token chain. Both the green power consumption evaluation and the consumption label issuance are performed on the chain, which improves credibility of the green power consumption evaluation and the consumption label issuance.

S105: Generate a unique digital identifier for the green power attribute certificate and the green power consumption label separately based on an NFT.

In this embodiment of the present disclosure, the NFT generates, by using an NFT technology, the unique digital identifier based on the "green power attribute certificate" issued by the certification chain and the unique digital identifier based on the "green power consumption label" issued by the token chain. The unique digital identifier is mapped into and associated with a two-dimensional code, and records key information of the green power attribute certificate and the green power consumption label in detail, which realizes non-interchangeability, uniqueness, indivisibility, and other characteristics of the certificate and the identifier.

The NFT is a non-fungible digital asset based on a blockchain background. A non-replaceable token is indivisible, irreplaceable, and unique. In theory, the NFT can anchor all non-fungible objects in reality, so as to realize a token-based real world, and form a digital asset world with value interconnection and information exchange. For example, the NFT may be used to uniquely label each item in a game with a special number, including a pet, a weapon, a prop, clothing, and other items. The NFT is stored on the blockchain, and its information, ownership, and all transaction records are transparent and open, and cannot be destroyed or tampered with.

S106: In a green power attribute certification process of the certification chain and in a green power consumption certification process of the token chain, supervise and verify, by using a chain of custody, execution information of each node in the certification processes of the certification chain and the token chain; and store the unique digital identifier in the token chain if the execution information passes the supervision and verification, or store abnormal associated data in the chain of custody if the execution information does not pass the supervision and verification.

The chain of custody performs data interaction with the certification chain and the token chain through the multi-chain interaction in a supervision and verification process, and the execution information includes operation status information of each node, execution status information of a consensus algorithm, and execution status information of the smart contract.

As a blockchain that can supervise the certification process, the chain of custody can obtain the proof-of-existence data, extract relevant data, perform behavior detection and abnormality pre-warning, and the like. Therefore, the chain of custody performs the data interaction with the certification chain and the token chain through the multi-chain interaction in the supervision and verification process. Specifically, the chain of custody may be provided with a supervision node. The supervision node can link and perform data interaction with the certification chain and the token chain based on the unique blockchain identifier generated through the multi-chain interaction, to complete the supervision and verification in the certification process. A specific supervision and verification process is to be described in a subsequent embodiment.

In this embodiment of the present disclosure, the certification chain, the token chain, and the chain of custody are blockchains with different functions, in other words, they are essentially blockchains. Because the blockchain has non-tamperability, traceability, and other characteristics, both processing of the relevant data and the certification process are completed on the chain. For example, the green power attribute certification process is completed on the certification chain, the green power consumption certification process is completed on the token chain, and the supervision and verification of the certification process is completed on the chain of custody. Moreover, in this embodiment of the present disclosure, key data generated can be stored on the chain. For example, the certification chain can store the proof-of-existence data on the chain in the green power attribute certification process, and can also store the generated green power attribute certificate. Correspondingly, in the green power consumption certification process, the token chain can store relevant data applied in the consumption evaluation model or generated intermediate data on the chain, and can also store the generated green power consumption label on the chain. In addition, each blockchain can also store data on the blockchain through the multi-chain interaction. For example, the chain of custody transmits the unique digital identifier passing the verification to the token chain for storage. In this way, the key data can be stored on the chain, which facilitates traceability of subsequent data.

This embodiment of the present disclosure provides a blockchain-based green power certification method, to pre-process obtained basic data to obtain proof-of-existence data, certify the proof-of-existence data from a production side and a consumption side by using a certification chain and a token chain respectively, and obtain a green power attribute certificate and a green power consumption label if the certification is passed; generate a unique digital identifier for the green power attribute certificate and the green power consumption label separately based on an NFT, which realizes non-interchangeability, indivisibility, and other characteristics of the certificate and the identifier; and supervise and verify a certification process by using a chain of custody, and generate a corresponding unique blockchain identifier for the certification chain, the token chain, and the chain of custody separately through multi-chain interaction, so as to realize data interaction between blockchains. This resolves problems of an inaccurate certification mechanism of renewable energy, and information asymmetry and data opaqueness in attribute certification and consumption evaluation processes of the renewable energy.

Embodiment 2

The following describes possible implementations of the embodiments of the present disclosure, and related terms in the present disclosure are explained first.

Blockchain: The blockchain is a technical system that is jointly maintained by a plurality of parties, uses cryptography to ensure security of transmission and access, and can achieve consistent data storage, which makes it difficult to tamper with data and prevents repudiation. Based on different business functions, this embodiment of the present disclosure includes a certification chain, a token chain, and a chain of custody, which respectively realize functions of green power certification, token identifier issuance, and penetrating business supervision.

NFT: It is a non-fungible digital asset based on a blockchain background. A non-replaceable token is indivisible, irreplaceable, and unique. In theory, the NFT can anchor all non-fungible objects in reality, so as to realize a token-based real world, and form a digital asset world with value interconnection and information exchange. For example, the NFT may be used to uniquely label each item in a game with a special number, including a pet, a weapon, a prop, clothing, and other items. The NFT is stored on the blockchain, and its information, ownership, and all transaction records are transparent and open, and cannot be destroyed or tampered with.

Identification system: It mainly used to encode, decode, and set a unique identifier for each of a device, an apparatus, a system, and other resources, and realize cross-system and cross-enterprise information query and sharing among entities. Each entity can conduct unique positioning and information query based on the unique identifier. The identification system can ensure global interoperability and mutual recognition of the unique identifier, break a data barrier between heterogeneous systems, and achieve security, credibility and interconnection.

Figure 2:
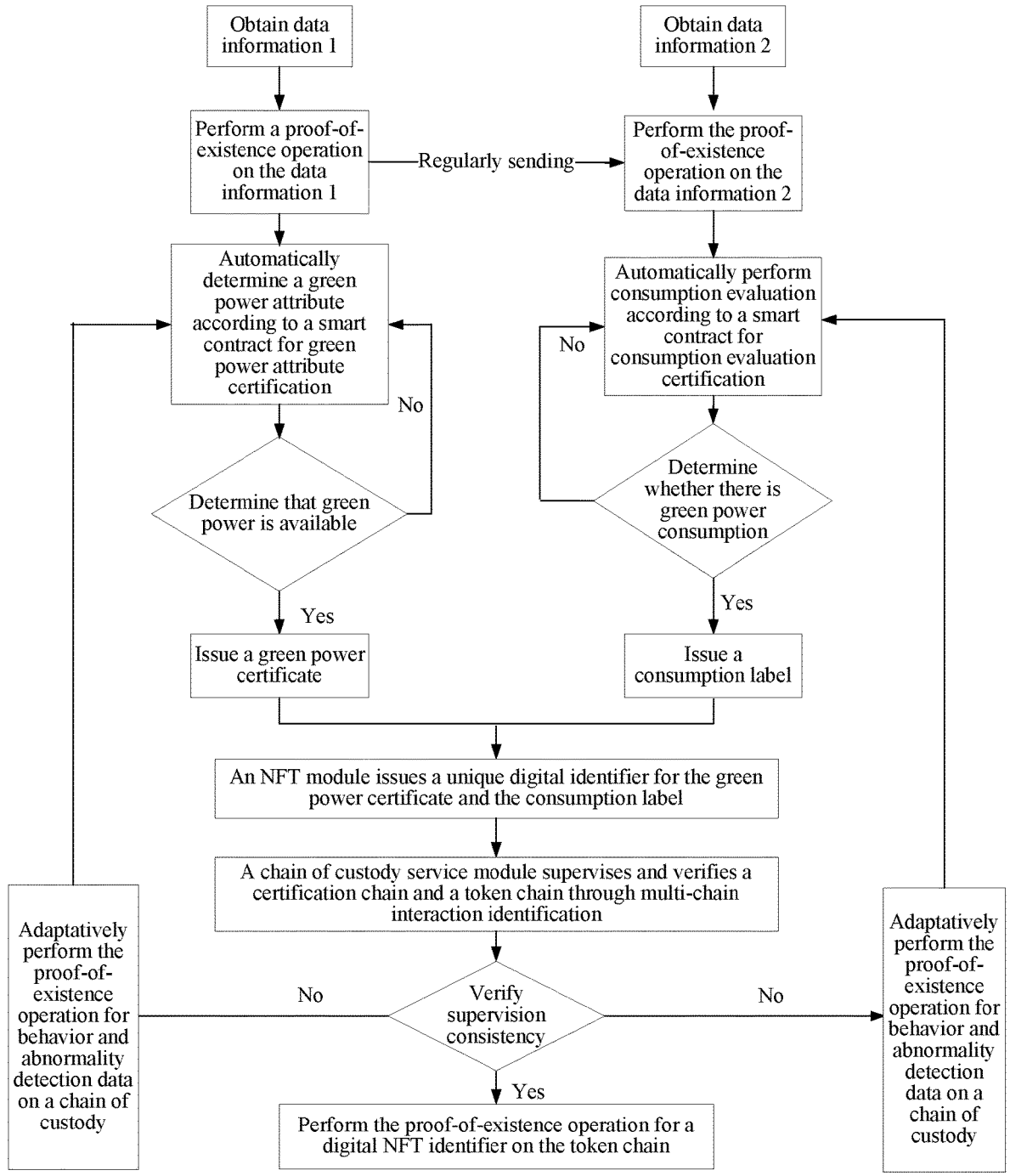
FIG. 2 is a schematic flowchart of another blockchain-based green power certification method according to Embodiment 2 of the present disclosure.

FIG. 2 is a flowchart of another blockchain-based green power certification method according to this embodiment of the present disclosure. Detailed description of some steps in the flowchart has been explained in Embodiment 1, and reference may be made to Embodiment 1 for specific details. In Embodiment 2, relevant details are mainly supplemented. In FIG. 2, obtaining data information 1 is to obtain basic data to be extracted in a green power certification process on a production side, and obtaining data information 2 is to obtain basic data to be extracted in a green power certification process on a consumption side. A smart contract for green power attribute certification is a smart contract constructed based on a green power certification model, and a smart contract for consumption evaluation certification is a smart contract constructed based on a consumption evaluation model.

In an implementation of this implementation of the present disclosure, the method further includes:

storing supervision data obtained in a supervision and verification process in the chain of custody.

The storing abnormal associated data in the chain of custody if the execution information does not pass the supervision and verification includes:

if the execution information does not pass the supervision and verification, controlling the chain of custody to obtain data in the certification process through the multi-chain interaction, processing abnormal data to obtain the abnormal associated data, and storing the abnormal associated data in the chain of custody, where the abnormal associated data includes abnormality pre-warning and prediction data.

Specifically, the above supervision and verification process can be achieved by using the chain of custody. The chain of custody is provided with a supervision node. The supervision node can link and perform data interaction with supervision nodes in a certification chain service module and a token chain service module based on a chain identifier, and supervise and verify a whole process of issuing the "green power attribute certificate" by the certification chain and a whole process of issuing the "green power consumption label" by the token chain, including an operation status, a consensus algorithm, and smart contract execution of each node in the certification chain and the token chain. If the whole processes pass the supervision and verification, generated unique digital identifiers of the "green power attribute certificate" and the "green power consumption label" are stored in the certification chain. If the whole processes do not pass the supervision and verification, the chain of custody conducts adaptive data extraction and analysis, detects, positions and traces abnormal data, performs abnormality pre-warning and prediction to obtain abnormality pre-warning and prediction data, and performs a proof-of-existence operation for the abnormality pre-warning and prediction data.

In a possible implementation, the determining, based on the constraints and the proof-of-existence data, whether an attribute of electric energy generated by a power station is a green power attribute includes:

in response to that the proof-of-existence data meets all of the first constraint, the second constraint, and the third constraint, and is consistent with a cross-validation result of the entity identifier code of the device related to the renewable energy, the business data of the power business system, and the electronic contract-associated data, determining that the attribute of the electric energy generated by the power station is the green power attribute.

It should be noted that during certification, the certification chain determines that the attribute of the electric energy generated by the power station is the green power attribute, in other words, the electric energy is renewable electric energy, only when the proof-of-existence data meets all the above three constraints and is consistent with the cross-validation result of the entity identifier of the device related to the renewable energy, the business data of the power business system, and the electronic contract-associated data.

For example, time T is taken as a settlement cycle and may be set based on an actual situation, a planned power generation curve $S_{pv}$ of a power station is selected, a predicted power consumption curve $S_{user}$ of a power user is selected, an on-grid electricity quantity is $Q_{pv}$, a settled electricity quantity is $Q_{user}$, and a measured value of a smart electricity meter is $Q_E$.

$$\int_a^b S_{pv}(x)dx > \int_a^b S_{user}(x)dx \qquad (1)$$

$$Q_{pv} > Q_{user} \qquad (2)$$

$$Q_{user} = Q_{Eb} - Q_{Ea} \qquad (3)$$

The above formulas (1), (2), and (3) correspond to the first constraint, the second constraint, and the third constraint respectively. In the above formulas, a and b represent any two time points selected for certification, b>a, $Q_{Eb}$ represents a measured value of the smart electricity meter at the time point b, and $Q_{Ea}$ represents a measured value of the smart electricity meter at the time point a.

When the proof-of-existence data meets all the above three conditions shown in the formulas (1), (2), and (3), and is consistent with the cross-validation result of the "entity identifier+business system data information" and the electronic contract-associated data, whether power produced on a power generation side has a green attribute is determined, and a certificate issuance unit of the certification chain issues the "green power attribute certificate" on the chain when it is determined that the power produced on the power generation side has the green attribute.

Correspondingly, in an implementation of this embodiment of the present disclosure, the generating a green power attribute certificate by using the certification chain includes:

calling the proof-of-existence data by using the certification chain, to determine content of the green power attribute certificate, where the content of the green power attribute certificate includes a certificate number, a proof-of-existence number, proof-of-existence time, a power generation enterprise, a power generation type, production data, power generation data, and a settlement status, and the proof-of-existence number and the proof-of-existence time respectively represent a number and time of an proof-of-existence operation that is performed on the token chain for an identifier issued by the NFT and verified by the chain of custody; and generating the green power attribute certificate based on the content of the green power attribute certificate.

In another implementation of this embodiment of the present disclosure, the controlling the token chain to call a consumption evaluation model and the proof-of-existence data to determine whether the power user on a power consumption side performs green power consumption includes:

controlling the token chain to call the consumption evaluation model to obtain a user environment evaluation parameter on the power consumption side;

calculating a value of a user environment evaluation index on the power consumption side based on the user environment evaluation parameter on the power consumption side, as well as a weight, an evaluation score, and a correlation coefficient that correspond to each user environment evaluation parameter on the power consumption side;

controlling the token chain to call the consumption evaluation model to obtain electric energy data of the user on the power consumption side, where the electric energy data includes a sum of renewable energy power generated by a self-built power generation facility, a sum of renewable energy power purchased according to electricity purchasing and selling contracts, a sum of renewable energy power labeled on a purchased green power attribute certificate, a sum of renewable energy power used by an upstream supplier, a sum of renewable energy power used by the power user in a target cycle, and a sum of all power used in the target cycle;

calculating a value of a green power consumption evaluation index based on the electric energy data; and determining, based on the value of the user environment evaluation index and the value of the green power consumption evaluation index on the power consumption side, whether the power user on the power consumption side performs the green power consumption.

Specifically, a smart consumption evaluation contract is constructed based on the consumption evaluation model. When certifying the proof-of-existence data, the token chain can automatically call the smart consumption evaluation contract, such that a consumption evaluation value can be automatically calculated on the chain, and a consumption label issuance unit of the token chain issues the "green power consumption label" on the chain when it is determined that the power user on the power consumption side performs the green power consumption.

The consumption evaluation model mainly includes the user environment evaluation parameter and the green power consumption evaluation parameter on the power consumption side. The user environment evaluation parameter is a green rating of a power consumption enterprise or individual. A green enterprise is an enterprise whose main business contributes to environmental improvement. The green rating may be 5A, 4A, 3A, or the like. The green power consumption evaluation parameter is a proportion of green power consumption of the enterprise, and its value may be 100%, 95%, 80%, or the like.

In this embodiment of the present disclosure, the user on the power consumption side mainly is the power consumption enterprise. The user environment evaluation index on the power consumption side is mainly evaluated quantitatively from pollution prevention and control, ecological protection, environmental management, social impacts, information disclosure, environmental recognition, and the like. The above indexes are classified into a positive index and a negative index. A larger value of the positive index leads to better evaluation on an enterprise environment; and a smaller value of the negative index leads to worse evaluation on the enterprise environment.

The positive index is calculated as follows:

$$Z_{mn} = \frac{x_{mn} - \max x_{mn}}{\max x_{mn} - \min x_{mn}} \qquad (4)$$

The negative index is calculated as follows:

$$Z_{mn} = \frac{\max x_{mn} - x_{mn}}{\max x_{mn} - \min x_{mn}} \qquad (5)$$

$$X_{mn} = \frac{\min|x_m - x_n| + \rho \max|x_m - x_n|}{|x_m - x_n| + \rho \max|x_m - x_n|} \qquad (6)$$

In the above formulas, $x_{mn}$ represents an $n^{th}$ initial index score of an $m^{th}$ index; and $Z_{min}$ represents an $n^{th}$ index evaluation score of the $m^{th}$ index, and m may be set based on an index of an evaluation system; $X_{mn}$ represents a correlation coefficient of $x_m$ and $x_n$. N data samples are selected, $x_m$ represents an index calculation value of an $m^{th}$ index in the N samples, $x_n$ represents an index calculation value of an $n^{th}$ index in the N samples, and p represents an adjustment coefficient.

$$R = \begin{bmatrix} X_{11} & \cdots & X_{1n} \\ \vdots & \ddots & \vdots \\ X_{m1} & \cdots & X_{mn} \end{bmatrix} \qquad (7)$$

The correlation matrix R is used to calculate a value of an evaluation index of the enterprise environment, and a rating is determined based on the value.

The value of the green power consumption evaluation index is mainly a percentage of renewable energy used in production, processing and other operations on the power consumption side in a cycle. If all power users and upstream suppliers purchase green power attribute certificates, the value of the green power consumption evaluation index is 100%. If not all power users and upstream suppliers purchase green power attribute certificates, the value of the green power consumption evaluation index is calculated according to a following model:

$$\eta = \frac{Q_o + Q_b + Q_g + Q_s + Q_e}{Q_i \times N} \times 100\% \qquad (8)$$

In the above model, η represents the value of the green power consumption evaluation index, and $Q_o$ represents the sum of the renewable energy power generated by the self-built power generation facility of the power user on the power consumption side; $Q_b$ represents a sum of renewable energy power purchased by the power user according to the electricity purchasing and selling contracts; $Q_g$ represents the sum of the renewable energy power labeled in the green power attribute certificate purchased by the power user; $Q_s$ represents the sum of the renewable energy power used by the upstream supplier of the power user; $Q_e$ represents the sum of the renewable energy power used by the power user in the cycle. $Q_i \times N$ represents a sum of all power used by the power user in the certain cycle, including renewable energy power and conventional power.

A consumption evaluation unit of the token chain evaluates a green power consumption status of the power user on the power consumption side. When η reaches a specified threshold value, the consumption label issuance unit of the token chain issues the "green power consumption label" on the chain.

The green power consumption label includes but is not limited to a label number, a proof-of-existence number, proof-of-existence time, a power consumption enterprise, a percentage of a consumed electricity quantity, an enterprise environment evaluation rating, a consumption cycle, and the like, and the label number and the proof-of-existence time respectively represent a number and time of an proof-of-existence operation that is performed on the token chain for an identifier issued by the NFT and verified by the chain of custody.

Based on technical characteristics of openness, transparency, traceability, and non-tamperability of the certification chain and the token chain, this embodiment of the present disclosure proposes a certification and evaluation solution of the renewable energy based on the green certification chain and the token chain, and constructs certification evaluation standards for green power production and consumption of the renewable energy. The certification chain and the token chain cooperate with each other, and the issuance process is implemented by the smart contract on the chain, thereby realizing credible management of a green attribute and consumption evaluation of the renewable energy. A multi-chain information interaction mechanism based on an identification technology is constructed. By using the identification technology, a multi-chain collaborative, safe, and reliable interaction mode is constructed to realize trusted linking, interaction, and interoperability between chains, break a data barrier, avoid a data island, and promote interconnection and resource sharing between heterogeneous chain systems. An innovative supervision technology is provided to realize penetrating supervision of the supervision node of the chain of custody over supervision nodes of other chains, thereby improving a supervision level, and improving data security. In addition, an NFT technology is used to anchor a digital identifier token for which the proof-of-existence operation is to be performed on the chain. This generates a token-based green power attribute certificate and green power consumption label, such that the certificate and label are non-interchangeable, unique, and indivisible. The proof-of-existence operation is performed on the chain for relevant information of the certificate and the label that each have the unique digital identifier. The above information is transparent and open, and is not destroyed or tampered with, thereby improving authenticity and authority of the certificate and the label.

Embodiment 3

The embodiments of the present disclosure further provide a blockchain-based green power certification system, including:

a data obtaining module, a certification chain, a token chain, a chain of custody, an interaction module, and a token service module, where
the data obtaining module is configured to pre-process obtained basic data to obtain structured data and unstructured data, and send the structured data and the unstructured data to the certification chain, where the structured data includes associated data that maps an entity identifier of a device related to renewable energy into business data of a power business system, and the unstructured data includes announcement-associated data and electronic contract-associated data in a power business;

the certification chain is configured to perform a proof-of-existence operation for the structured data and the unstructured data to obtain proof-of-existence data, and periodically send the proof-of-existence data to the token chain based on the interaction module;

the certification chain is further configured to: call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate, where the constraints include a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;

the token chain is configured to: call a consumption evaluation model and the proof-of-existence data to determine whether the power user on a power consumption side performs green power consumption, and if the power user on the power consumption side performs the green power consumption, generate a green power consumption label, where the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;

the token service module is configured to generate a unique digital identifier for the green power attribute certificate and the green power consumption label separately based on an NFT;

the chain of custody is configured to: in a green power attribute certification process of the certification chain and in a green power consumption certification process of the token chain, supervise and verify execution information of each node in the certification processes of the certification chain and the token chain; and store the unique digital identifier in the token chain if the execution information passes the supervision and verification, or store abnormal associated data in the chain of custody if the execution information does not pass the supervision and verification, where the chain of custody performs data interaction with the certification chain and the token chain by using the interaction module in a supervision and verification process, and the execution information includes operation status information of each node, execution status information of a consensus algorithm, and execution status information of a smart contract; and the interaction module is configured to generate a corresponding unique blockchain identifier for the certification chain, the token chain, and the chain of custody separately, such that the certification chain, the token chain, and the chain of custody can realize data interaction by using the interaction module.

In practical application, information processing and certification processes in the certification chain are mainly implemented based on a certification chain service module. Correspondingly, information processing and certification processes in the token chain are mainly implemented based on a token chain service module, and the chain of custody is implemented based on a chain of custody service module. The interaction module includes a multi-chain interaction identification module, and the token service module is an NFT service module.

In this embodiment of the present disclosure, the data obtaining module, the interaction module, and the token service module each may be one or more processors, controllers or chips that each have a communication interface, can realize a communication protocol, and may further include a memory, a related interface and system transmission bus, and the like if necessary. The processor, controller or chip executes program-related code to realize a corresponding function. In an alternative solution, the data obtaining module, the interaction module, and the token service module share an integrated chip or share devices such as a processor, a controller and a memory. The shared processor, controller or chip executes program-related codes to implement corresponding functions.

Figure 3:
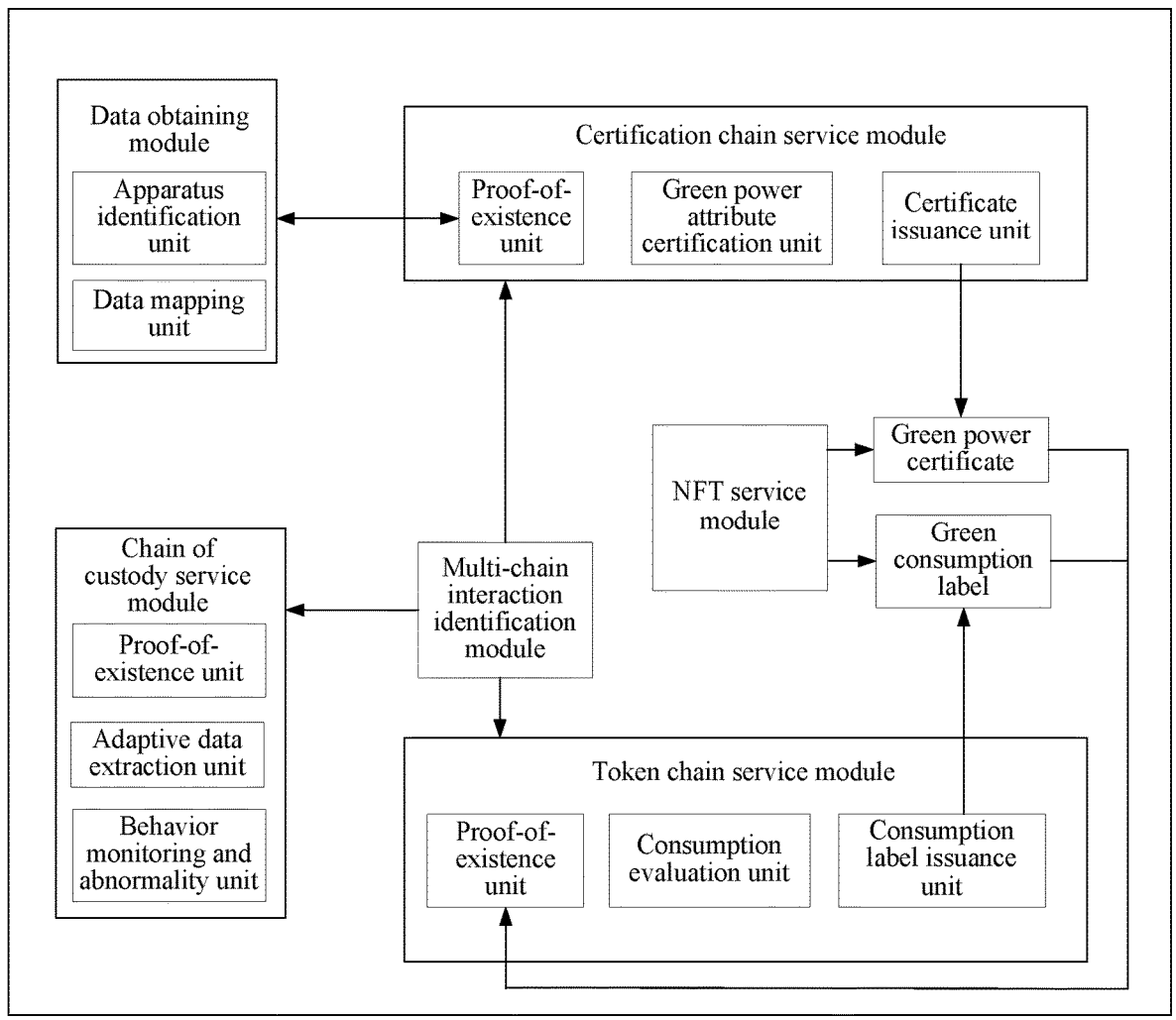
FIG. 3 is a schematic structural diagram of a blockchain-based green power certification system according to Embodiment 3 of the present disclosure.

For example, in practical application, FIG. 3 is a schematic structural diagram of a blockchain-based green power certification system according to Embodiment 3 of the present disclosure. The system mainly includes a data obtaining module, a certification chain service module, a token chain service module, a chain of custody service module, an NFT service module, and a multi-chain interaction identification module.

The data obtaining module is composed of an apparatus identification unit and a data mapping unit to obtain structured data related to a power regulation system, a power transaction system, a marketing system, a GIS, and other business systems, as well as unstructured data such as a transaction announcement and an electronic contract. The apparatus identification unit can provide an identifier registration service for a photovoltaic module, a wind turbine generator, an inverter, a transmission line, a transformer, a smart electricity meter, and other related devices and apparatuses, and provide a unique identifier for a related apparatus. The data mapping unit performs data mapping and binding with each business system based on the apparatus identification unit, so as to trace and position a data source.

The token chain service module mainly includes a proof-of-existence unit, a consumption evaluation unit, a consumption label issuance unit, and other functional units, and is configured to realize consistent data storage, tampering prevention, and traceability, provide basic public service support for formulation and implementation of smart contracts for green power consumption evaluation and consumption label issuance, and realize the green power consumption evaluation and the consumption label issuance based on a token chain. Both the consumption evaluation and the label issuance are implemented on the chain, which improves credibility of the green power consumption evaluation and the consumption label issuance. The token chain service module can perform data interaction with the certification chain service module and the chain of custody service module by using the multi-chain interaction identification module. The NFT service module issues a unique NFT for a green power attribute certificate and a green power consumption label, and saves the unique NFT in the proof-of-existence unit of the token chain, such that the data cannot be destroyed or tampered with.

The chain of custody service module mainly includes a proof-of-existence unit, an adaptive data extraction unit, a behavior monitoring and abnormality unit, and other functional units. The chain of custody service module can perform data interaction with the certification chain service module and the token chain service module by using the multi-chain interaction identification module, to support a whole-process proof-of-existence operation for a supervision process and supervision data on the chain of custody. A smart contract for the chain of custody is used to automatically perform data extraction, and conduct behavior monitoring and abnormality pre-warning for other application chains, to detect, position, and trace an abnormal condition, provide pr-warning and prediction for the abnormal condition, and finally achieve efficient, reliable and whole-process supervision of a plurality of supervision departments for a multi-chain application.

The NFT service module uses an NFT technology to provide a unique digital identifier for the green power attribute certificate and the green power consumption label, so as to realize anti-counterfeiting and facilitate tracing, updating, circulation, transaction, and other functions. An obtained unique identifier token records key information of the green power attribute certificate and the green power consumption detail, which realizes non-interchangeability, uniqueness, indivisibility, and other characteristics of the certificate and the identifier.

The multi-chain interaction identification module provides the identifier registration service for the certification chain service module, the token chain service module, and the chain of custody service module, and can provide a unique identifier with a same prefix for a plurality of blockchain service modules, and construct a multi-chain collaborative, fair, and reliable interaction mode, thereby realizing trusted linking and efficient collaboration of cross-chain resources, breaking a data barrier, realizing interconnection, resource sharing, reliable supervision, and the like.

Based on a structure of the system, this embodiment of the present disclosure can perform production certification and consumption certification for renewable energy, generate an NFT identifier, perform multi-chain identifier registration, and perform supervision and verification.

Specifically, a production certification process of the renewable energy includes obtaining data and performing a proof-of-existence operation on the data, determining a green power attribute, and performing certificate issuance. The obtaining data and performing a proof-of-existence operation on the data includes: obtaining entity identifiers of a relevant device and apparatus in a whole production chain of the renewable energy, such as solar energy, wind energy, hydraulic energy, biomass energy, and geothermal energy; obtaining power generation curves, on-grid electricity quantities, settled electricity quantities, ledgers, locations, and other data information of the power regulation system, the transaction system, the marketing system, the GIS, and other power business systems; and after mapping the entity identifiers into corresponding data information, storing structured data of "the entity identifier+the business system data information" on a certification chain, and storing unstructured data such as an electronic electricity purchasing or selling contract, the transaction announcement, and a green power production commitment letter on the certification chain.

A photovoltaic power station is taken as an example for description. The apparatus identification unit of the certification system provides the identifier registration service for a photovoltaic power station (such as a photovoltaic module, an inverter, and a combiner box), a step-up transformer, a transmission line, a step-down transformer, a distribution box, an intelligent terminal, a smart electricity meter, and other devices and apparatuses in a photovoltaic power generation system, assigns a unique identifier to each device and apparatus, and uploads data collected by a relevant collection apparatus to a corresponding business system through communication. The data mapping unit maps each physical identifier into data of a corresponding business system to ensure that a data source of a whole power generation chain of the photovoltaic power station can be positioned and traced in physical and spatial dimensions.

Processes of determining the green power attribute determining and performing certificate issuance have been described in detail in Embodiment 2 of the present disclosure, and will not be described herein again. Reference may be made to Embodiment 2 for details.

A consumption certification process of the renewable energy includes obtaining data and performing the proof-of-existence operation on the data, consumption evaluation, and certificate issuance. When obtaining the data and performing the proof-of-existence operation on the data, the certification chain service module regularly sends original proof-of-existence data to the token chain service module by using the multi-chain interaction identification module, to form a dual-chain data protection mechanism. Data sending time may be set based on a business status. Green power attribute information and electricity quantity data of the smart electricity meter on a power consumption side that are regularly sent in the certification chain, and other structured data are obtained and stored through the proof-of-existence operation on the token chain. In addition, the electronic electricity purchasing or selling contract, the green power production commitment letter, and other unstructured data are obtained and stored through the proof-of-existence operation on the token chain. Processes of the consumption evaluation and the certificate issuance have been described in detail in Embodiment 2 of the present disclosure, and will not be described herein again. Reference may be made to Embodiment 2 for details.

NFT identifier: the NFT technology is used to generate the unique digital identifier for the "green power attribute certificate" issued by the certification chain and the unique digital identifier for the "green power consumption label" issued by the token chain. The unique identifier token is mapped into and associated with a two-dimensional code, and records key information of the green power attribute certificate and the green power consumption label in detail, which realizes non-interchangeability, uniqueness, indivisibility, and other characteristics of the certificate and the identifier.

During multi-chain identifier registration and supervision and verification:

The multi-chain interaction identification module provides the identifier registration service for the certification chain service module, the token chain service module, and the chain of custody service module, and provide a unique chain identifier for these modules by using an encoding technology such as Handle, OID, or Ecode. A unified identifier can be used to realize trusted linking and efficient interaction of cross-chain resources.

The chain of custody service module is provided with a supervision node. The supervision node can link and perform data interaction with supervision nodes in the certification chain service module and the token chain service module based on the chain identifier, and supervise and verify a whole process of issuing the "green power attribute certificate" by the certification chain and a whole process of issuing the "green power consumption label" by the token chain, including an operation status, a consensus algorithm, and smart contract execution of each node in the certification chain and the token chain. If the whole processes pass the supervision and verification, the generated unique digital identifiers of the "green power attribute certificate" and the "green power consumption label" are stored in the certification chain. If the whole processes do not pass the supervision and verification, the chain of custody service module conducts adaptive data extraction and analysis, detects, positions and traces abnormal data, performs abnormality pre-warning and prediction, and stores the abnormal data.

In this embodiment of the present disclosure, the certification chain service module, the token chain service module, the chain of custody service module, the NFT service module, and the multi-chain interaction identification module each may be one or more processors, controllers or chips that each have a communication interface, can realize a communication protocol, and may further include a memory, a related interface and system transmission bus, and the like if necessary. The processor, controller or chip executes program-related code to realize a corresponding function. In an alternative solution, the certification chain service module, the token chain service module, the chain of custody service module, the NFT service module, and the multi-chain interaction identification module share an integrated chip or share devices such as a processor, a controller and a memory. The shared processor, controller or chip executes program-related codes to implement corresponding functions.

The apparatus identification unit, the data mapping unit, the proof-of-existence unit, the consumption evaluation unit, the consumption label issuance unit, the adaptive data extraction unit, the behavior monitoring and abnormality unit, the supervision node each may be one or more processors, controllers or chips that each have a communication interface, can realize a communication protocol, and may further include a memory, a related interface and system transmission bus, and the like if necessary. The processor, controller or chip executes program-related code to realize a corresponding function. In an alternative solution, the apparatus identification unit, the data mapping unit, the proof-of-existence unit, the consumption evaluation unit, the consumption label issuance unit, the adaptive data extraction unit, the behavior monitoring and abnormality unit, and the supervision node share an integrated chip or share devices such as a processor, a controller and a memory. The shared processor, controller or chip executes program-related codes to implement corresponding functions.

Embodiment 3 of the present disclosure provides a blockchain-based green power certification system, which mainly resolves problems such as lack of green power production and consumption certification standards of renewable energy and difficulty in accurately determining a green attribute of the renewable energy, constructs the green power production and consumption certification standards of the renewable energy, and establishes a renewable energy certification system and method based on a green certification chain, and provides a complete solution for determining a green production attribute of the renewable energy and certifying and evaluating green power consumption. This plays a positive role in promoting clean energy production and low-carbon energy consumption, guiding the whole society to improve green power consumption, accelerating construction of a clean, low-carbon, safe and efficient energy system, and promoting the healthy development of green energy production and consumption.

Embodiment 4

Figure 4:
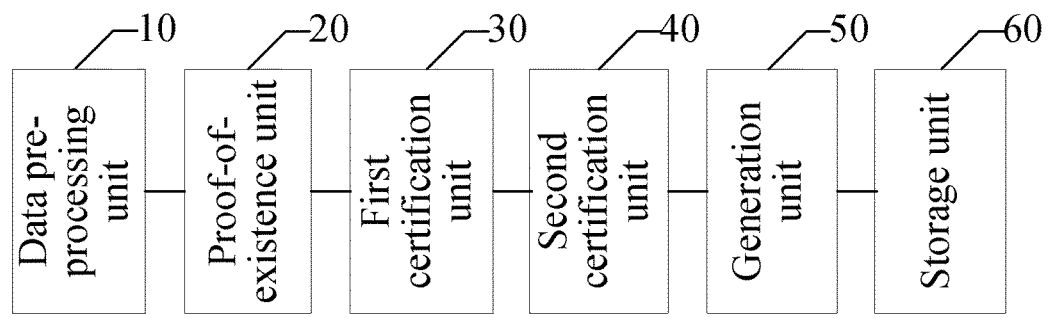
FIG. 4 is a schematic structural diagram of a blockchain-based green power certification apparatus according to an Embodiment 4 of the present disclosure.

Based on the above embodiments, Embodiment 4 of the present disclosure provides a blockchain-based green power certification apparatus. As shown in FIG. 4, the apparatus includes:
- a data pre-processing unit 10 configured to pre-process obtained basic data to obtain structured data and unstructured data, where the structured data includes associated data that maps an entity identifier of a device related to renewable energy into business data of a power business system, and the unstructured data includes announcement-associated data and electronic contract-associated data in a power business;
- a proof-of-existence unit 20 configured to perform a proof-of-existence operation for the structured data and the unstructured data on a certification chain to obtain stored data, and control the certification chain to periodically send the proof-of-existence data to a token chain through multi-chain interaction, where the certification chain is a blockchain used to achieve green power attribute certification and certificate issuance, and the token chain is a blockchain used to achieve green power consumption evaluation and consumption label issuance, the multi-chain interaction is to register an identifier for each blockchain, such that each blockchain has a unique blockchain identifier, and data interaction is performed between blockchains based on their own blockchain identifiers;
- a first certification unit 30 configured to: control the certification chain to call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate by using the certification chain, where the constraints include a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;
- a second certification unit 40 configured to: control the token chain to call a consumption evaluation model and the proof-of-existence data to determine whether the power user on a power consumption side performs green power consumption, and if the power user on the power consumption side performs the green power consumption, generating a green power consumption label by using the token chain, where the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;
- a generation unit 50 configured to generate a unique digital identifier for the green power attribute certificate and the green power consumption label separately based on an NFT; and
- a storage unit 60 configured to: in a green power attribute certification process of the certification chain and in a green power consumption certification process of the token chain, supervise and verify, by using a chain of custody, execution information of each node in the certification processes of the certification chain and the token chain; and store the unique digital identifier in the token chain if the execution information passes the supervision and verification, or store abnormal associated data in the chain of custody if the execution information does not pass the supervision and verification, where the chain of custody performs data interaction with the certification chain and the token chain through the multi-chain interaction in a supervision and verification process, and the execution information includes operation status information of each node, execution status information of a consensus algorithm, and execution status information of a smart contract.

In this embodiment of the present disclosure, the data obtaining unit 10, the proof-of-existence unit 20, the first certification unit 30, the second certification unit 40, the generation unit 50, and the storage unit 60 each may be one or more processors, controllers or chips that each have a communication interface, can realize a communication protocol, and may further include a memory, a related interface and system transmission bus, and the like if necessary. The processor, controller or chip executes program-related code to realize a corresponding function. In an alternative solution, the data obtaining unit 10, the proof-of-existence unit 20, the first certification unit 30, the second certification unit 40, the generation unit 50, and the storage unit 60 share an integrated chip or share devices such as a processor, a controller and a memory. The shared processor, controller or chip executes program-related codes to implement corresponding functions.

It should be noted that for specific process processes performed by each unit of the blockchain-based green power certification apparatus provided in this embodiment of the present disclosure, reference may be made to the description of the above embodiments, and details are not described herein again.

This embodiment of the present disclosure provides a blockchain-based green power certification apparatus, to pre-process obtained basic data to obtain proof-of-existence data, certify the proof-of-existence data from a production side and a consumption side by using a certification chain and a token chain respectively, and obtain a green power attribute certificate and a green power consumption label if the certification is passed; generate a unique digital identifier for the green power attribute certificate and the green power consumption label separately based on an NFT, which realizes non-interchangeability, indivisibility, and other characteristics of the certificate and the identifier; and supervise and verify a certification process by using a chain of custody, and generate a corresponding unique blockchain identifier for the certification chain, the token chain, and the chain of custody separately through multi-chain interaction, so as to realize data interaction between blockchains. This resolves problems of an inaccurate certification mechanism of renewable energy, and information asymmetry and data opaqueness in attribute certification and consumption evaluation processes of the renewable energy.

Each embodiment of the present specification is described in a progressive manner, each embodiment focuses on the difference from other embodiments, and the same and similar parts between the embodiments may refer to each other. Since an apparatus disclosed in the embodiments corresponds to a method disclosed in the embodiments, its description is relatively simple, and reference may be made to partial description of the method for relevant contents.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

The invention claimed is:

1. A blockchain-based green power certification method, comprising:
   pre-processing obtained basic data to obtain structured data and unstructured data, wherein the structured data comprises associated data that maps an entity identifier of a device related to renewable energy into business data of a power business system, and the unstructured data comprises announcement-associated data and electronic contract-associated data in a power business;
   performing a proof-of-existence operation for the structured data and the unstructured data on a certification chain to obtain proof-of-existence data, and controlling the certification chain to periodically send the proof-of-existence data to a token chain through multi-chain interaction, wherein the certification chain is a blockchain used to achieve green power attribute certification and certificate issuance, and the token chain is a blockchain used to achieve green power consumption evaluation and consumption label issuance, the multi-chain interaction is to register an identifier for each blockchain, such that each blockchain has a unique blockchain identifier, and data interaction is performed between blockchains based on their own blockchain identifiers;
   controlling the certification chain to call a green power certification model and the proof-of-existence data to obtain constraints of the green power certification model, determining, based on the constraints and the proof-of-existence data, whether an attribute of electric energy generated by a power station is a green power attribute, and if the attribute of the electric energy generated by the power station is the green power attribute, generating a green power attribute certificate by using the certification chain, wherein the constraints comprise a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;
   controlling the token chain to call a consumption evaluation model and the proof-of-existence data to determine whether the power user on a power consumption side performs green power consumption, and if the power user on the power consumption side performs the green power consumption, generating a green power consumption label by using the token chain, wherein the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;
   generating a unique digital identifier for the green power attribute certificate and the green power consumption label separately based on a non-fungible token (NFT); and
   in a green power attribute certification process of the certification chain and in a green power consumption certification process of the token chain, supervising and verifying, by using a chain of custody, execution information of each node in the certification processes of the certification chain and the token chain; and storing the unique digital identifier in the token chain if the execution information passes the supervision and verification, or storing abnormal associated data in the chain of custody if the execution information does not pass the supervision and verification, wherein the chain of custody performs data interaction with the certification chain and the token chain through the multi-chain interaction in a supervision and verification process, and the execution information comprises operation status information of each node, execution status information of a consensus algorithm, and execution status information of a smart contract;
   wherein the business data of the power business system comprises power generation curves, on-grid electricity quantities, settled electricity quantities, ledgers and locations;
   wherein the method further comprises:
   storing supervision data obtained in the supervision and verification process in the chain of custody, wherein
   the storing abnormal associated data in the chain of custody if the execution information does not pass the supervision and verification comprises:
   if the execution information does not pass the supervision and verification, controlling the chain of custody to obtain data in the certification process through the multi-chain interaction, processing abnormal data to obtain the abnormal associated data, and storing the abnormal associated data in the chain of custody, wherein the abnormal associated data comprises abnormality pre-warning and prediction data.

2. The method according to claim 1, wherein the pre-processing obtained basic data to obtain structured data and unstructured data comprises:

obtaining the basic data, comprising device information of a whole production chain of renewable power, the business data of the power business system, and the announcement-associated data and the electronic contract-associated data in the power business;

generating a device code of each device in the whole production chain of the renewable power based on the device information of the whole production chain of the renewable power;

mapping the device code into the business data of the power business system to obtain associated data, and determining the associated data as the structured data; and standardizing the announcement-associated data and the electronic contract-associated data in the power business, and determining processed data as the unstructured data.

3. The method according to claim 1, wherein the determining, based on the constraints and the proof-of-existence data, whether an attribute of electric energy generated by a power station is a green power attribute comprises:

in response to that the proof-of-existence data meets all of the first constraint, the second constraint, and the third constraint, and is consistent with a cross-validation result of the entity identifier of the device related to the renewable energy, the business data of the power business system, and the electronic contract-associated data, determining that the attribute of the electric energy generated by the power station is the green power attribute.

4. The method according to claim 1, wherein the controlling the token chain to call a consumption evaluation model and the proof-of-existence data to determine whether the power user on a power consumption side performs green power consumption comprises:

controlling the token chain to call the consumption evaluation model to obtain the user environment evaluation parameter on the power consumption side;

calculating a value of a user environment evaluation index on the power consumption side based on the user environment evaluation parameter on the power consumption side, as well as a weight, an evaluation score, and a correlation coefficient that correspond to each user environment evaluation parameter on the power consumption side;

controlling the token chain to call the consumption evaluation model to obtain electric energy data of the user on the power consumption side, where the electric energy data includes a sum of renewable energy power generated by a self-built power generation facility, a sum of renewable energy power purchased according to electricity purchasing and selling contracts, a sum of renewable energy power labeled on a purchased green power attribute certificate, a sum of renewable energy power used by an upstream supplier, a sum of renewable energy power used by the power user in a target cycle, and a sum of all power used in the target cycle;

calculating a value of a green power consumption evaluation index based on the electric energy data; and determining, based on the value of the user environment evaluation index and the value of the green power consumption evaluation index on the power consumption side, whether the power user on the power consumption side performs the green power consumption.

5. The method according to claim 1, wherein the unique blockchain identifier comprises prefix information and distinction information, the prefix information is prefix code information that is the same as that of other blockchains, the distinction information is code information different from that of the other blockchains, and data interworking is realized between the blockchains based on a unique blockchain identifier of each blockchain.

6. The method according to claim 1, wherein the generating a green power attribute certificate by using the certification chain comprises:

calling the proof-of-existence data by using the certification chain, to determine content of the green power attribute certificate, wherein the content of the green power attribute certificate comprises a certificate number, a proof-of-existence number, proof-of-existence time, a power generation enterprise, a power generation type, production data, power generation data, and a settlement status, and the proof-of-existence number and the proof-of-existence time respectively represent a number and time of an proof-of-existence operation that is performed on the token chain for an identifier issued by the NFT and verified by the chain of custody; and generating the green power attribute certificate based on the content of the green power attribute certificate.

7. The method according to claim 1, wherein the green power consumption label comprises a label number, a proof-of-existence number, proof-of-existence time, a power consumption enterprise, a percentage of a consumed electricity quantity, an enterprise environment evaluation rating, and consumption cycle data, and the label number and the proof-of-existence time respectively represent a number and time of an proof-of-existence operation that is performed on the token chain for an identifier issued by the NFT and verified by the chain of custody.

8. A blockchain-based green power certification apparatus, comprising:

a data pre-processing unit configured to pre-process obtained basic data to obtain structured data and unstructured data, wherein the structured data comprises associated data that maps an entity identifier of a device related to renewable energy into business data of a power business system, and the unstructured data comprises announcement-associated data and electronic contract-associated data in a power business;

a proof-of-existence unit configured to perform a proof-of-existence operation for the structured data and the unstructured data on a certification chain to obtain proof-of-existence data, and control the certification chain to periodically send the proof-of-existence data to a token chain through multi-chain interaction, wherein the certification chain is a blockchain used to achieve green power attribute certification and certificate issuance, and the token chain is a blockchain used to achieve green power consumption evaluation and consumption label issuance, the multi-chain interaction is to register an identifier for each blockchain, such that each blockchain has a unique blockchain identifier, and data interaction is performed between blockchains based on their own blockchain identifiers;

a first certification unit configured to: control the certification chain to call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate by using the certification chain, wherein the constraints comprise a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;

a second certification unit configured to: control the token chain to call a consumption evaluation model and the proof-of-existence data to determine whether the power user on a power consumption side performs green power consumption, and if the power user on the power consumption side performs the green power consumption, generate a green power consumption label by using the token chain, wherein the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;

a generation unit configured to generate a unique digital identifier for the green power attribute certificate and the green power consumption label separately based on a non-fungible token (NFT); and a storage unit configured to: in a green power attribute certification process of the certification chain and in a green power consumption certification process of the token chain, supervise and verify, by using a chain of custody, execution information of each node in the certification processes of the certification chain and the token chain; and store the unique digital identifier in the token chain if the execution information passes the supervision and verification, or store abnormal associated data in the chain of custody if the execution information does not pass the supervision and verification, wherein the chain of custody performs data interaction with the certification chain and the token chain through the multi-chain interaction in a supervision and verification process, and the execution information comprises operation status information of each node, execution status information of a consensus algorithm, and execution status information of a smart contract;

wherein the business data of the power business system comprises power generation curves, on-grid electricity quantities, settled electricity quantities, ledgers and locations;

wherein the storage unit is further configured to store supervision data obtained in the supervision and verification process in the chain of custody;

wherein the storage unit is configured to store abnormal associated data in the chain of custody if the execution information does not pass the supervision and verification, and is specifically configured to: if the execution information does not pass the supervision and verification, control the chain of custody to obtain data in the certification process through the multi-chain interaction, process abnormal data to obtain the abnormal associated data, and store the abnormal associated data in the chain of custody, wherein the abnormal associated data comprises abnormality pre-warning and prediction data.

9. A blockchain-based green power certification system, comprising:

a data obtaining module, a certification chain, a token chain, a chain of custody, an interaction module, and a token service module, wherein the data obtaining module is configured to pre-process obtained basic data to obtain structured data and unstructured data, and send the structured data and the unstructured data to the certification chain, wherein the structured data comprises associated data that maps an entity identifier of a device related to renewable energy into business data of a power business system, and the unstructured data comprises announcement-associated data and electronic contract-associated data in a power business;

the certification chain is configured to perform a proof-of-existence operation for the structured data and the unstructured data to obtain proof-of-existence data, and periodically send the proof-of-existence data to the token chain based on the interaction module;

the certification chain is further configured to: call a green power certification model and the proof-of-existence data to obtain constraints of the green power certification model, determine, based on the constraints and the proof-of-existence data, whether an attribute of electric energy generated by a power station is a green power attribute, and if the attribute of the electric energy generated by the power station is the green power attribute, generate a green power attribute certificate, wherein the constraints comprise a first constraint, a second constraint, and a third constraint, the first constraint is a constraint generated based on a planned power generation curve of the power station and a predicted power consumption curve of a power user, the second constraint is a condition for determining whether an on-grid electricity quantity is greater than a settled electricity quantity, and the third constraint is a condition for determining whether the settled electricity quantity is a difference between electricity quantities of a smart electricity meter within power consumption time;

the token chain is configured to: call a consumption evaluation model and the proof-of-existence data to determine whether the power user on a power consumption side performs green power consumption, and if the power user on the power consumption side performs the green power consumption, generate a green power consumption label, wherein the consumption evaluation model is an evaluation model generated based on a user environment evaluation parameter and a green power consumption evaluation parameter on the power consumption side, the user environment evaluation parameter is a green rating of a power consumption enterprise or individual, and the green power consumption evaluation parameter is a proportion of green power consumption of the enterprise;

the token service module is configured to generate a unique digital identifier for the green power attribute certificate and the green power consumption label separately based on a non-fungible token (NFT);

the chain of custody is configured to: in a green power attribute certification process of the certification chain and in a green power consumption certification process of the token chain, supervise and verify execution information of each node in the certification processes of the certification chain and the token chain; and store the unique digital identifier in the token chain if the execution information passes the supervision and verification, or store abnormal associated data in the chain of custody if the execution information does not pass the supervision and verification, wherein the chain of custody performs data interaction with the certification chain and the token chain by using the interaction module in a supervision and verification process, and the execution information comprises operation status information of each node, execution status information of a consensus algorithm, and execution status information of a smart contract; and the interaction module is configured to generate a corresponding unique blockchain identifier for the certification chain, the token chain, and the chain of custody separately, such that the certification chain, the token chain, and the chain of custody can realize data interaction by using the interaction module;

wherein the business data of the power business system comprises power generation curves, on-grid electricity quantities, settled electricity quantities, ledgers and locations;

wherein the chain of custody is further configured to store supervision data obtained in the supervision and verification process;

wherein the chain of custody is configured to store abnormal associated data in the chain of custody if the execution information does not pass the supervision and verification, and is specifically configured to: if the execution information does not pass the supervision and verification, obtain data in the certification process through the multi-chain interaction, process abnormal data to obtain the abnormal associated data, and store the abnormal associated data, wherein the abnormal associated data comprises abnormality pre-warning and prediction data.

* * * * *